(12) United States Patent
Kondo et al.

(10) Patent No.: US 7,942,423 B2
(45) Date of Patent: May 17, 2011

(54) LIP TYPE SEAL

(75) Inventors: Yosuke Kondo, Nihonmatsu (JP); Yasuaki Tanabe, Nihonmatsu (JP); Junichi Nakayama, Fujisawa (JP); Tamio Inamura, Fujisawa (JP); Koichi Mizunoya, Fukushima (JP); Takeo Otani, Fukushima (JP); Kokichi Hamamoto, Fukushima (JP)

(73) Assignee: NOK Corporation (JP)

( * ) Notice: Subject to any disclaimer, the term of this patent is extended or adjusted under 35 U.S.C. 154(b) by 330 days.

(21) Appl. No.: 11/922,076

(22) PCT Filed: May 24, 2006

(86) PCT No.: PCT/JP2006/310295
§ 371 (c)(1), (2), (4) Date: Dec. 12, 2007

(87) PCT Pub. No.: WO2006/134756
PCT Pub. Date: Dec. 21, 2006

(65) Prior Publication Data
US 2009/0302549 A1    Dec. 10, 2009

(30) Foreign Application Priority Data

Jun. 14, 2005   (JP) .................... 2005-173283

(51) Int. Cl.
*F16J 15/32* (2006.01)
(52) U.S. Cl. ........................ 277/353; 277/562
(58) Field of Classification Search .................. 277/353, 277/549, 562, 564
See application file for complete search history.

(56) References Cited

U.S. PATENT DOCUMENTS

| | | | | |
|---|---|---|---|---|
| 4,578,856 | A | * | 4/1986 | Butler .............................. 29/451 |
| 4,699,526 | A | * | 10/1987 | Sato .............................. 384/486 |
| 4,709,930 | A | * | 12/1987 | Forch ............................ 277/430 |
| 4,844,480 | A | * | 7/1989 | Gralka .......................... 277/552 |

(Continued)

FOREIGN PATENT DOCUMENTS

DE    33 27 229 A1    2/1985

(Continued)

OTHER PUBLICATIONS

Merriam-Webster Dictionary, definitions of "wedge" and "plate", accessed Jun. 15, 2010.*

(Continued)

*Primary Examiner* — Shane Bomar
*Assistant Examiner* — Blake Michener
(74) *Attorney, Agent, or Firm* — Harness, Dickey & Pierce, P.L.C.

(57) ABSTRACT

A resin lip type seal (1) capable of increasing safety against rupture by reducing rigidity of a plate-like lip (4) bent around a tip point A of a approximately wedge-shaped recessed part (8) to reduce stress concentration at the point A, suppressing the lowering of sealability due to a reduction in creep of the lip, and increasing the follow-up capability of the lip to the eccentricity of its axis. Indentations are formed on the slidable contact surface (41) of the plate-like lip (4) or/and the anti-slidable contact surface (42) thereof. Indentations (7) are also formed on the sloped slidable contact surface (21) of the inner lip (2) of the seal. Then, the ratio of the portion of each of the slidable contact surfaces where the indentations (7) are formed is ½ or more of each of the surface areas of the slidable contact surfaces (21, 41, 42).

5 Claims, 4 Drawing Sheets

U.S. PATENT DOCUMENTS

| | | | | |
|---|---|---|---|---|
| 4,886,281 | A | * | 12/1989 | Ehrmann et al. ............... 277/560 |
| 4,995,623 | A | * | 2/1991 | Wada et al. .................... 277/552 |
| 5,615,894 | A | * | 4/1997 | vom Schemm ................ 277/559 |
| 5,649,709 | A | * | 7/1997 | Munekata et al. ............. 277/560 |
| 5,664,651 | A | * | 9/1997 | Miura et al. ............. 188/322.17 |
| 5,979,904 | A | * | 11/1999 | Balsells ........................ 277/554 |
| 6,045,138 | A | * | 4/2000 | Kanzaki ........................ 277/562 |
| 6,336,638 | B1 | * | 1/2002 | Guth et al. .................... 277/500 |
| 6,513,810 | B1 | | 2/2003 | Pataille et al. |
| 6,616,146 | B2 | * | 9/2003 | Friend et al. .................. 277/560 |
| 6,860,486 | B2 | * | 3/2005 | Hacker et al. ................. 277/553 |
| 7,100,924 | B2 | * | 9/2006 | Toth et al. ..................... 277/558 |
| 7,513,506 | B2 | * | 4/2009 | Kondo et al. .................. 277/353 |
| 2004/0164496 | A1 | * | 8/2004 | Okada et al. .................. 277/549 |
| 2009/0230630 | A1 | * | 9/2009 | Kondo et al. .................. 277/553 |
| 2009/0267306 | A1 | * | 10/2009 | Eguchi .......................... 277/562 |

FOREIGN PATENT DOCUMENTS

| | | |
|---|---|---|
| DE | 34 20 523 A1 | 12/1985 |
| DE | 199 14 921 A1 | 10/2000 |
| DE | 101 17 881 A1 | 11/2002 |
| EP | 0 133 928 A1 | 3/1985 |
| EP | 1 041 318 A2 | 10/2000 |
| EP | 1 249 648 A2 | 10/2002 |
| JP | S56-117161 U | 9/1981 |
| JP | S61-117962 U | 7/1986 |
| JP | 08-082372 A | 3/1996 |
| JP | 2000-320689 A | 11/2000 |
| JP | 2002-323137 A | 11/2002 |
| JP | 2002-349390 A | 12/2002 |
| JP | 2003-247646 A | 9/2003 |

OTHER PUBLICATIONS

International Search Report for PCT/JP2006/310295 in English and Japanese.

Written Opinion for PCT/JP2006/310295 in Japanese.

* cited by examiner

LIP TYPE SEAL

CROSS-REFERENCE TO RELATED APPLICATIONS

This is a national stage of the International Application No. PCT/JP2006/310295 filed May 24, 2006 and published in Japanese.

BACKGROUND OF THE INVENTION

1. Field of the Invention

The present invention relates to a lip type seal made of a resin such as PTFE and the like for use in high pressure fuel pump such as an injection pump employed in a gasoline direct injection engine, and for use in other general hydraulic or pneumatic pressure equipments.

2. Description of the Conventional Art

The use environment of the two fluid sealing which used in a plunger of an injection pump for sealing the gasoline and engine oil tends to become increasingly severe in consequence of superior performance of the injection pump for the gasoline direct-injection engine. It is required for the sealing device to improve resistance to pressure and chemical resistance as a countermeasure against bad fuel, and to this end, it has been proposed in these days that the conventional oil seal is changed to a lip type seal made of resin such as PTFE.

A conventional lip type seal 101, as shown in FIG. 7, has inner and outer circumferential lips 103 and 104 which have an approximately cylindrical recessed portion 102 opening toward a first sealing fluid side A, provided at inner and outer peripheries of the cylindrical recessed portion 102, and are slidably in contact with a shaft and a housing respectively, and a plate-like lip 105 which has an approximately wedge-shaped recessed portion 106 opening toward the shaft at a second sealing fluid side B and is provided at the second sealing fluid side B of the wedge-shaped recessed portion 106, where the inner and outer circumferential lips 103 and 104 are formed integrally with the plate-like lip 105 into one-piece structure made of resin. When the shaft 107 is inserted toward the inner periphery side in a direction indicated by a big arrow X, the plate-like lip 105 is bent largely around a tip point A of the approximately wedge-shaped recessed portion 106 in a direction indicated by an arrow Y, and an interference is secured by its reactional restoration force. However, since the lip type seal 101 is made of resin, it has a disadvantage of lowered sealability due to reduced interference of the plate-like lip 105 caused by poor creep characteristics of the resin. That is to say, since the sealing is effected by the reactional restoration force of the plate-like lip 105 bent around the tip point A, there would be a potential rupture due to stress concentration onto the tip point A, and besides rupture, there is a disadvantage of reduced interference of the plate-like lip 105 due to creep.

Further, comparing with one made of a rubber material or the like, the resin-made lip type seal has disadvantages of poor resilient characteristics, reduced adhesion to the shaft, and reduced sealability.

Incidentally, Japanese unexamined utility model publication No. 61-117962 and Japanese unexamined patent publication No. 2000-320689 disclose an oil seal attached to the retaining ring wherein serrated patterns are formed on the lip, however, nothing is disclosed about a lip type seal made of resin.

SUMMARY OF THE INVENTION

Problem to be Solved by the Invention

In view of the above-mentioned problems, it is an object of the present invention to solve the problems by providing a plate-like lip bend around a tip point A of a wedge-shaped recessed portion in a resin-made lip type seal with reduced rigidity, thereby to reduce the stress concentration onto the tip point A, to improve safety factor against rupture, to suppress lowering of sealability by reduction in creep, and to improve follow-up capability to decentering of a shaft.

Further, it is another object of the present invention to provide a resin-made lip type seal with an improved sealing performance.

Further, it is another object of the present invention to provide a resin-made lip type seal with controlled rigidity of a lip, thereby to control sliding resistance.

Means for Solving the Problem

To achieve the above-mentioned object, the lip type seal according to the present invention is mounted in an annular space between an operating member and a stationary member, and comprises:

a resin-made seal body including:

inner and outer circumferential lips which have an approximately cylindrical recessed portion opening toward a first sealing fluid side, are provided at inner and outer peripheries of the cylindrical recessed portion, and are slidably in contact with the operating member and the stationary member respectively, and a plate-like lip which has an approximately wedge-shaped recessed portion extending radially and opening toward the operating member at a second sealing fluid side being axially opposite to the first sealing fluid side, and is provided at the second sealing fluid side, and extends toward the second sealing fluid side to be slidably in contact with the operating member, said inner and outer circumferential lips being formed integrally with the plate-like lip into one-piece structure; and a spring having a U-shaped section and being mounted in the cylindrical recessed portion, wherein the plate-like lip has indentations formed on a surface slidably in contact with the operating member or/and the other side surface opposite thereto.

Further, the lip type seal described above may also have indentations formed on an inclined sliding contact surface of the inner circumferential lip. A ratio of the area of the part where indentations are formed to the surface area of the surface having the indentations may be set to ½ or more, as for at least one of the sliding contact surfaces and the surface opposite thereto of the lips where indentations are formed. The indentation may be formed having a triangular or semicircular sectional shape, and when the sectional shape of each indentation is a triangle, an angle of an inclined surface at the side of the object to be sealed may be larger than an angle of an inclined surface at the opposite side of the object to be sealed, where those angles are formed between respective inclined surfaces of one indentation and the operating member.

Further, in the lip type seal described above, the first sealing fluid side may be a side of the fuel such as gasoline, while the second sealing fluid side may be a side of the engine oil.

Effects of the Invention

According to the present invention, the following effects are achieved.

The lip type seal according to the present invention is provided with above structure and made of resin such as PTFE or the like, and indentations are formed on the sliding contact surface or/and the other surface opposite thereto of the plate-like lip, thereby rigidity of the lip can be reduced regardless of the lip being made of resin, and stress concentration onto the tip point A of the approximately wedge-shaped recessed portion of the plate-like lip can be reduced so that the safety factor against rupture can be improved.

Further, the plate-like lip is capable of reducing the creep by reducing the lip rigidity, and suppressing the lowering of sealability due to the reduced interference, and improving the follow-up capability to decentering of the shaft.

Further, the indentations are formed on the inclined sliding contact surface of the inner circumferential lip as well as the sliding contact surface of the plate-like lip to provide multi-stage lips, thereby the sealing performance can be improved.

Further, as to the surfaces of the plate-like lip and the inner circumferential lip where indentation are formed, a ratio of the area of the part where indentations are formed to the surface area of the sliding contact surface can be changed to control the lip rigidity, thereby the sliding resistance can be controlled.

DETAILED DESCRIPTION OF PREFERRED EMBODIMENT

A lip type seal according to the preferred embodiments of the present invention will now be described with reference to the attached drawings. The scope of the invention should not be limited to the contents disclosed in the below mentioned description of the preferred embodiments unless specified in particular.

A lip type seal according to the embodiments of the present invention is installed in an annular space between a housing and a shaft.

Figure 1:
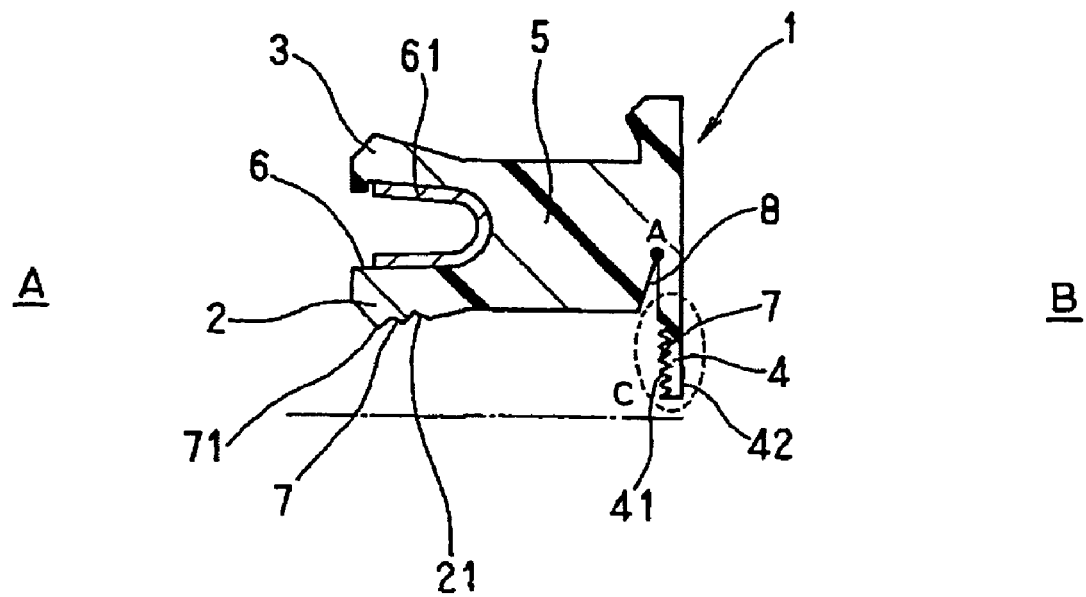
FIG. 1 is a sectional view showing a lip type seal according to a first embodiment of the present invention.

As shown in FIG. 1, the lip type seal 1 according to a first embodiment of the present invention is comprised of a seal body 5 made of PTFE resin including inner and outer circumferential lips 2 and 3 which have an approximately cylindrical recessed portion 6 opening toward a first sealing fluid side A, are provided at inner and outer peripheries of the cylindrical recessed portion 6, and are slidably in contact with a shaft and a housing respectively, and a plate-like lip 4 which has an approximately wedge-shaped recessed portion 8 extending radially and opening toward the shaft at a second sealing fluid side B being axially opposite to the first sealing fluid side A, and is provided at the second sealing fluid side B of the wedge-shaped recessed portion 8, the inner and outer circumferential lips 2 and 3 being formed integrally with the plate-like lip 4 into one-piece structure, and a spring 61 having a U-shaped section and being mounted in the cylindrical recessed portion 6.

Indentations 7 having an approximately triangular-shaped section are formed on an inclined sliding contact surface 21, which is in sliding contact with the shaft and located at the right side of the inner circumferential lip 2 in the FIG. 1, to suppress creep generated due to the spring 61 mounted in the approximately cylindrical recessed portion 6. In this case, it is preferable that a ratio of the area of the part where the indentations 7 are formed to the surface area of the inclined sliding contact surface 21 is ½ or more, and the ratio can be selected within this range depending on the use conditions.

Figure 2:
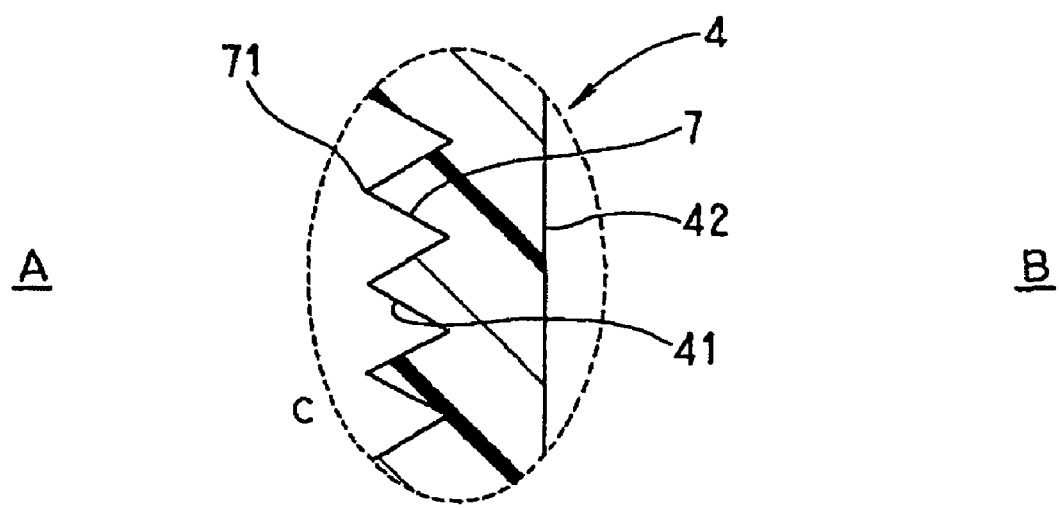
FIG. 2 is a partially enlarged sectional view of a part C in FIG. 1.

The plate-like lip 4 is formed having an approximately rectangular-shaped section and provided at the second sealing fluid side B of the approximately wedge-shaped recessed portion 8 provided at the second sealing fluid side B of the seal body 5 to extend radially and open toward the shaft side. Indentations 7 having an approximately triangular-shaped section are formed on a sliding contact surface 41 at the left side of the plate-like lip 4 in the FIG. 1. A region where indentations 7 are formed is encircled by a broken line C and illustrated in larger scale in FIG. 2. Tip portions 71 are preferably formed in a sharp shape to the utmost. Further, it is preferable that a ratio of the area of the part where the indentations 7 are formed to the surface area of the sliding contact surface 41 is ½ or more, and the ratio can be selected within this range depending on the use conditions. In addition, it is also preferable that the tip portions 71 of the indentations 7 formed on the inclined sliding contact surface 21 of the inner circumferential lip 2 are formed in a sharp shape to the utmost.

Figure 3:
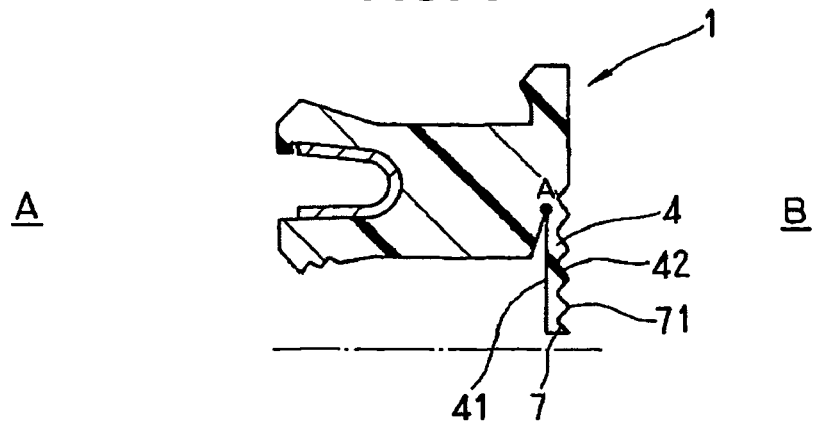
FIG. 3 is a sectional view showing a lip type seal according to a second embodiment of the present invention.
Figure 4:
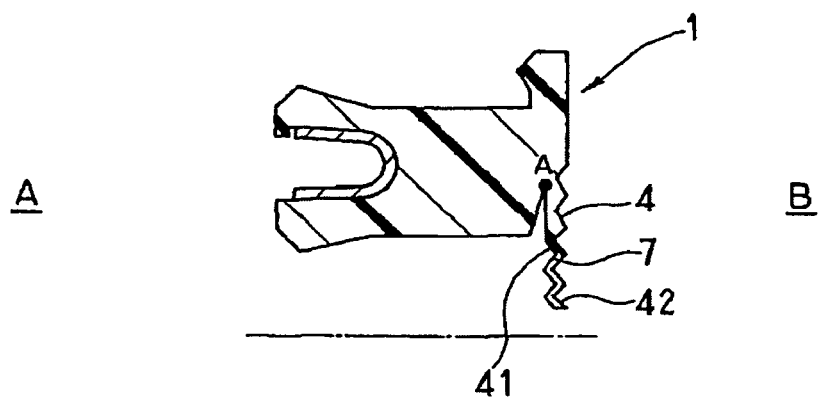
FIG. 4 is a sectional view showing a lip type seal according to a third embodiment of the present invention.

The indentations 7 of the plate-like lip 4 may be formed on the surface 42 opposite to the sliding contact surface 41, instead of the sliding contact surface 41 as in the second embodiment of the present invention shown in FIG. 3, and may be formed on both of the sliding contact surface 41 and the surface 42 opposite thereto as in the third embodiment of the present invention shown in FIG. 4. Similarly, when the indentations 7 are formed on the surface 42 opposite to the sliding contact surface 41, same as the sliding contact surface 41, it is preferable that a ratio of the area of part where indentations 7 are formed to the surface area of the surface 42 opposite to the sliding contact surface 41 is ½ or more, and the ratio can be selected within this range depending on the use conditions. In addition, it is also preferable that the tip portions 71 of the indentations 7 are formed in a sharp shape to the utmost.

Figure 5:
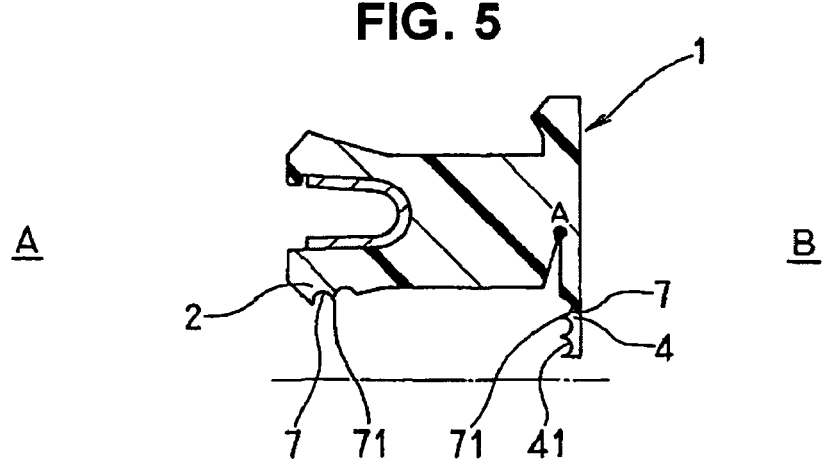
FIG. 5 is a sectional view showing a lip type seal according to a fourth embodiment of the present invention, FIGS. 6(1) to 6(3) are sectional views showing a state where the lip type seal according to the present invention is fitted onto a shaft.

Furthermore, the sectional shape of each indentation 7 may be a semi-circle, is not a triangular shape, as in the fourth embodiment of the present invention shown in FIG. 5, and may be any other sectional shape than a semi-circle. When each indentation 7 is formed having other sectional shape, it is also preferable that the tip portion 71 is formed in a sharp shape to the utmost. In addition, the indentations 7 may have different sectional shapes on the respective surfaces 41 and 42 of the plate-like lip 4.

Further, it is preferable that the indentations 7 are formed concentrically on the inner circumferential lip 2 and the plate-like lip 4, respectively. The shape of the indentations 7 formed on the inner circumferential lip 2 may be different from that formed on the plate-like lip 4.

Figure 6:
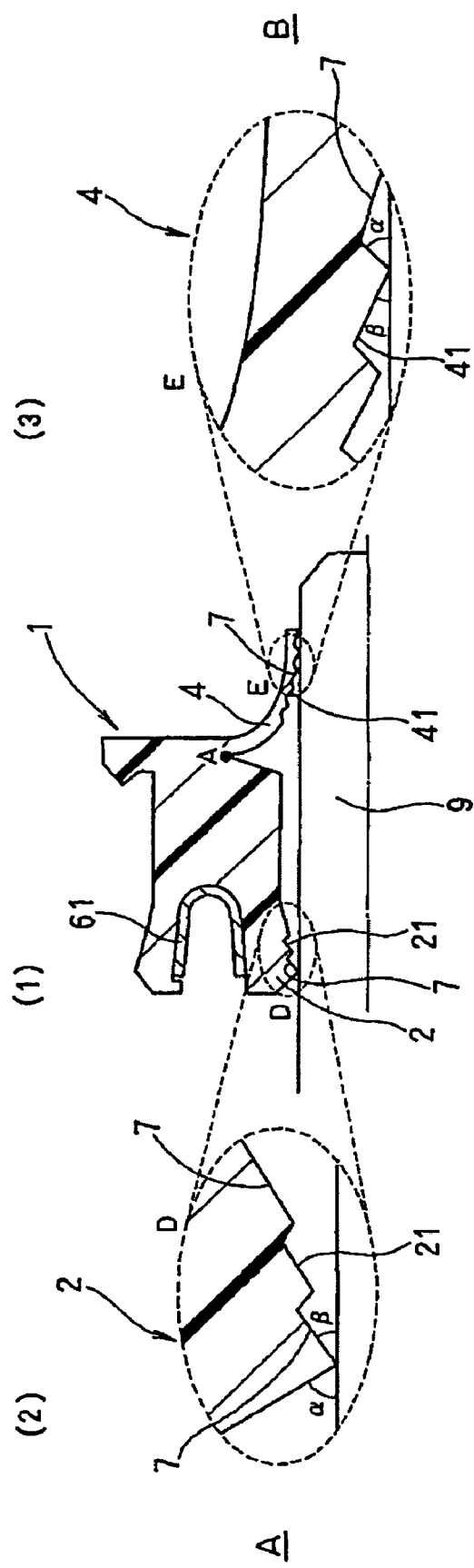
Figure 7:
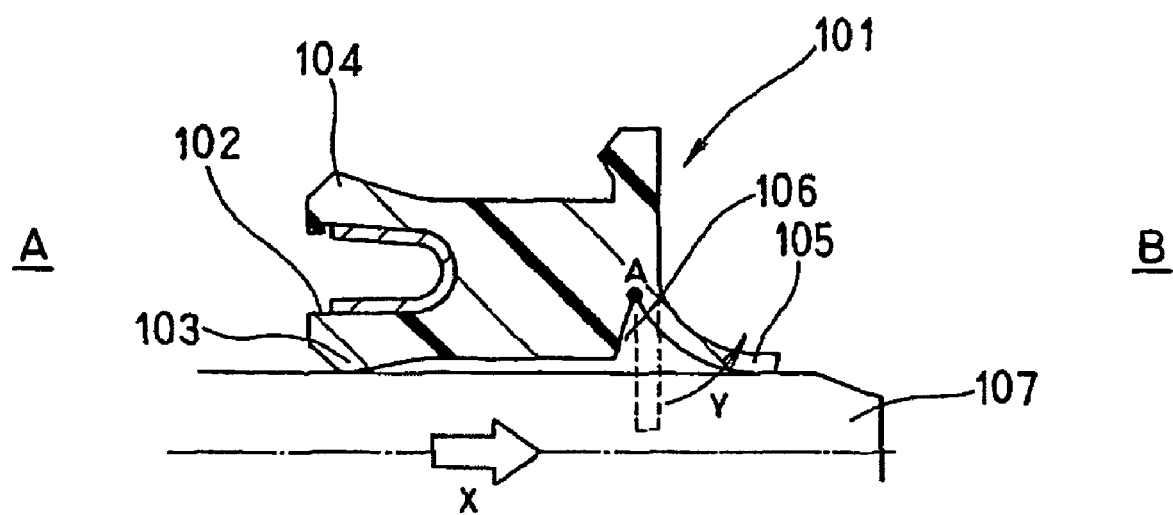
FIG. 7 is a sectional view showing a state where the conventional lip type seal is fitted onto a shaft.

Further, when the sectional shape of the indentation 7 is a triangle, as shown in FIGS. 6(1) to 6(3), an angle α of an inclined surface at the side of the object to be sealed is made larger than an angle β of an inclined surface at the opposite side of the object to be sealed, in the condition after insertion of the shaft 9. Namely, as shown in FIG. 6 (2) wherein a region encircled by a broken line D is illustrated in larger scale, the inner circumferential lip 2 against the object to be sealed at the left in the figure is configured such that the angle α of the inclined surface at the first sealing fluid side A which is the side of the object to be sealed is made larger than the angle β of the inclined surface at the second sealing fluid side B, while as shown in FIG. 6 (3) wherein a region encircled by a broken line E is illustrated in larger scale, the plate-like lip 4 against the object to be sealed at the right in the figure is configured such that the angle α of the inclined surface at the second sealing fluid side B which is the side of the object to be sealed is made larger than the angle β of the inclined surface at the first sealing fluid side A.

In the above embodiment, a case where the indentations 7 are formed on the inner circumferential lip 2 has been described, however, the indentations 7 are not limited to the above embodiment, for example, the indentations 7 may be formed only on the plate-like lip 4, but not formed on the inner circumferential lip 2.

According to the lip type seal 1 with the above configuration, as shown in FIGS. 6(1) to 6(3) illustrating the condition that the shaft 9 has been inserted to the inner circumferential side from the left side, the inner circumferential lip 2 is pressed radially so that an interference is secured, while multistage lips are provided because the indentations 7 are formed, adhesion to the shaft 9 is increased because rigidity is reduced, and thereby the sealing performance can be improved.

Further, the plate-like lip 4 is bent around the tip point A of the approximately wedge-shaped recessed portion and pressed radially by the reactional restoration force, so that an interference is secured, while the rigidity can be lowered because the indentations 7 are formed, the stress concentration occurred onto the tip point A is reduced, safety factors against the rupture can be improved, lowering of the sealability can be prevented by reduction in creep, and the follow-up capability to decentering of the shaft 9 can be improved. In addition, when indentations 7 are formed on the sliding contact surface 41, multistage lips are provided, thereby the sealability can be improved.

Furthermore, it is preferable that a ratio of the area of the part where indentations 7 are formed to the surface area of the inner circumferential lip 2 or the plate-like lip 4 is ½ or more, and by changing the ratio, the rigidity of the lips 2 and 4 can be controlled, thereby the sliding resistance can be controlled.

Furthermore, when the sectional shape of each indentation 7 is triangular, after the insertion of the shaft 9, the angle α of the inclined surface at the side of the object to be sealed is made larger than the angle β of the inclined surface at the opposite side of the object to be sealed, thereby sealing performance to the respective objects to be sealed can be improved further.

In the above embodiments, the first sealing fluid side may be a side of fuel such as gasoline, while the second sealing fluid side may be a side of engine oil, and vice versa, the first sealing fluid side may be a side of engine oil, while the second sealing fluid side may be a side of fuel such gasoline.

What is claimed is:

1. A lip type seal being mounted in an annular space between an operating member and a stationary member, and comprising:
   a resin-made seal body which is devoid of any exterior metal clamping ring and includes:
      inner and outer circumferential lips which have an approximately cylindrical recessed portion formed therebetween, the cylindrical recessed portion opening toward a first sealing fluid side, the inner and outer circumferential lips being provided at inner and outer peripheries of the cylindrical recessed portion, the inner and outer circumferential lips being slidably in contact with the operating member and the stationary member respectively,
      a plate-shaped lip which has an approximately wedge-shaped recessed portion having a triangular cross-section and extending radially and opening toward the operating member side at the second sealing fluid side which is axially opposite to the first sealing fluid side, the plate-shaped lip being provided at the second sealing fluid side, the plate-shaped lip arcuately bending from a closed end of the wedge-shaped recessed portion so as to extend in a curved shape toward the second sealing fluid side while slidably in face-to face contact with the operating member, and
      a solid body section having a rectangular cross-section disposed between the circumferential lips and the plate-shaped lip,
      said inner and outer circumferential lips being formed integrally with the plate-shaped lip into a one-piece structure; and
   a spring having a U-shaped section and being mounted in the cylindrical recessed portion,
   wherein the plate-shaped lip has indentations formed on at least one of:
      a first surface of the plate-shaped lip that is slidably in face to face contact with the operating member; and
      a second surface of the plate-shaped lip that is opposite to the first surface,
   wherein indentations are also formed on an inclined sliding contact surface of the inner circumferential inner lip, and
   wherein the indentations have a triangular sectional shape, and a first angle of a first inclined surface at a side of an object to be sealed is larger than a second angle of a second inclined surface at an opposite side of the object to be sealed, wherein the first and second angles are respectively formed between the first and second inclined surfaces of the indentations having a triangular shape and the operating member.

2. The lip type seal as claimed in claim 1, wherein a ratio of an area of a part where the indentations are formed to a surface area of the at least one of the first and second surface having the indentations is ½ or more.

3. The lip type seal as claimed in claim 1, wherein the first sealing fluid side is a side of fuel, and the second sealing fluid side is a side of engine oil.

4. A lip type seal being mountable in an annular space between an operating member and a stationary member, the seal comprising:
   a resin seal body which is devoid of any exterior metal clamping ring and includes:
      an inner circumferential lip;
      an outer circumferential lip radially spaced apart from the inner circumferential lip so as to form an approximately cylindrical recess therebetween, the cylindrical recess opening toward a first sealing fluid side of the seal,
      a radially extending wedge-shaped recess having a triangular cross-section and opening toward the operating member side of the seal, the wedge-shaped recess being located at a second sealing fluid side of the seal which is axially opposite to the first sealing fluid side,
      a plate-shaped lip located at the second sealing fluid side of the seal, the plate-shaped lip extending perpendicularly and radially from the seal body in an uninstalled condition, and arcuately bending from a closed end of the wedge-shaped recess so as to extend in a curved shape toward the second sealing fluid side while slidably face-to-face contacting the operating member in an installed condition, and a solid body having a rectangular cross-section disposed between the circumferential lips and the plate-shaped lip, said inner and outer circumferential lips being formed integrally with the plate-shaped lip into a one-piece structure; and a spring having a U-shaped section mounted in the cylindrical recess, wherein the plate-shaped lip has indentations formed on at least one of:
- a first surface of the plate-shaped lip that is slidably in face-to-face contact with the operating member; and
- a second surface of the plate-shaped lip that is opposite to the first surface;

wherein, in the installed condition, the inner and outer circumferential lips slidably contact the operating member and the stationary member respectively, wherein indentations are also formed on an inclined sliding contact surface of the inner circumferential inner lip, and wherein the indentations have a triangular sectional shape, and a first angle of a first inclined surface at a side of an object to be sealed is larger than a second angle of a second inclined surface at an opposite side of the object to be sealed, wherein the first and second angles are respectively formed between the first and second inclined surfaces of the indentations having a triangular shape and the operating member.

5. The lip type seal as claimed in claim 4, wherein a ratio of an area of a part where the indentations are formed to a surface area of the at least one of the first and second surface having the indentations is ½ or more.

* * * * *